No. 707,232. Patented Aug. 19, 1902.
H. A. HOUSE, Jr.
FRICTION BRAKE.
(Application filed Feb. 25, 1902.)

(No Model.)

Witnesses.

Inventor.

Henry Alonzo House Junior

THE NORRIS PETERS CO., PHOTO-LITHO., WASHINGTON, D. C.

UNITED STATES PATENT OFFICE.

HENRY ALONZO HOUSE, JR., OF HAMPSTEAD, ENGLAND.

FRICTION-BRAKE.

SPECIFICATION forming part of Letters Patent No. 707,232, dated August 19, 1902.

Application filed February 25, 1902. Serial No. 95,596. (No model.)

*To all whom it may concern:*

Be it known that I, HENRY ALONZO HOUSE, Jr., a citizen of the United States of America, residing at Hampstead, in the county of Middlesex, England, have invented certain new and useful Improvements in Friction-Brakes; and I do hereby declare the following to be a full, clear, and exact description of the invention, such as will enable others skilled in the art to which it appertains to make and use the same.

This invention relates more especially to brakes for motor-cars and other vehicles, but is also more or less applicable to brakes used for other purposes.

Figure 1:
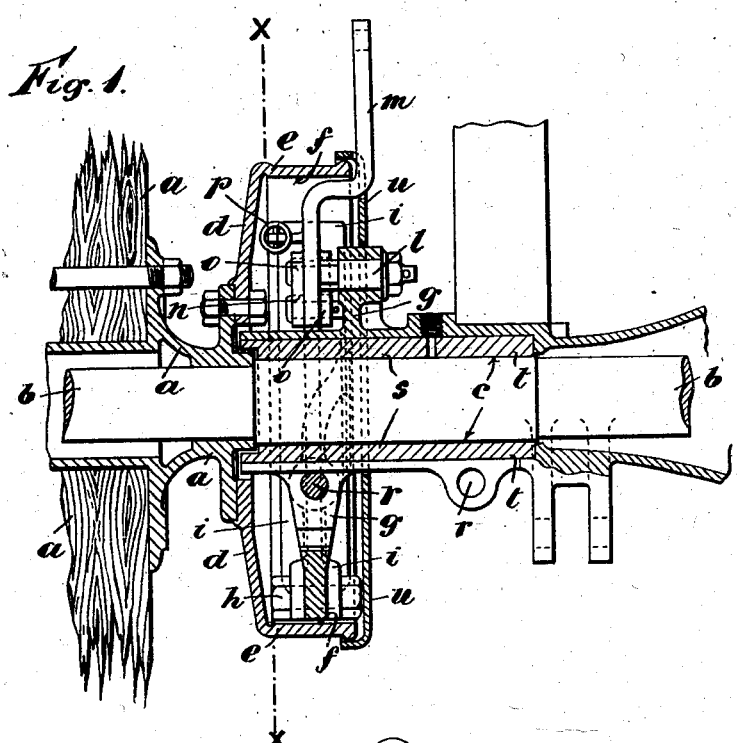
Figure 2:
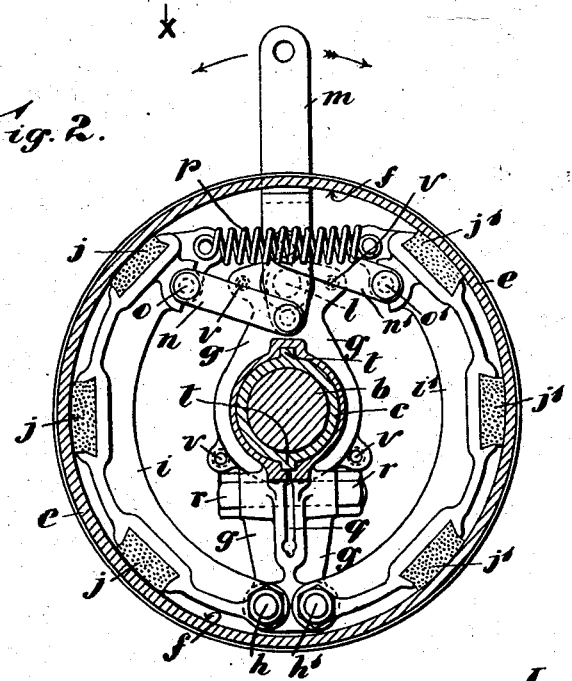

In the accompanying drawings, Figure 1 is a vertical section of a brake apparatus constructed in accordance with my invention and applied to the wheel of a motor-car, for example; and Fig. 2 is a vertical section on line $x\,x$ of Fig. 1.

$a$ is a portion of the hub of the wheel of a motor-car or other vehicle, for example, and $b$ is the axle thereof turning in the bearing $c$. Concentric with this axle $b$ is a disk or frame $d$, fixed to the hub $a$ and provided with a peripheral flange forming a short hollow cylinder $e$, the internal surface $f$ of which is preferably turned true and concentric with the axle $b$.

On the axle $b$ and preferably inside the hollow cylinder $e$ I secure a carriage or fixing $g$. To a point in this carriage or fixing $g$ intermediate between the center of the axle $b$ and the internal periphery of the hollow cylinder $e$—as at $h$, for example—I pin-joint a segmental brake-lever $i$, which may be provided or not with any suitable number of wooden or other brake-blocks $j$, adapted to bear against the internal surface $f$ of the hollow cylinder $e$, or the outer surface of the segmental lever $i$ may be adapted to bear directly against the said internal surface $f$. To another point $h'$, close to the first-named point $h$, I pin-joint a second segmental brake-lever $i'$, carrying brake-blocks $j'$, similar in all respects to the first named, but adapted to bear against the opposite side of the interior of the hollow cylinder $e$, or the two brake-levers $i$ and $i'$ may both be pin-jointed at one point or fulcrum, if desired. At a point of the carriage or fixing $g$ about diametrically opposite to the pin-joint connection or fulcra $h\,h'$ of the segmental brake-levers $i\,i'$ I mount on a fulcrum-pin $l$ an operating-lever $m$, which can be moved backward or forward in the direction of the arrows shown in Fig. 2 by suitable devices under the control of the driver. This lever $m$ is connected by pin-jointed links $n\,n'$ or the like to the free ends of the two segmental brake-levers at $o$ $o'$ in such manner that when the operating-lever $m$ is moved in the direction of the feathered arrow in Fig. 2 the segmental brake-levers $i\,i'$ are both pressed outward, so that they or the brake-blocks $j\,j'$, fixed to them, as the case may be, exert frictional pressure against the internal surface $f$ of the hollow cylinder $e$, and when the operating-lever is moved in the direction of the plain arrow in Fig. 2 the segmental brake-levers $i\,i'$ are moved inward away from the internal surface $f$ of the hollow cylinder $e$, so as to withdraw the brake-surfaces $j\,j'$ therefrom. This withdrawal of the segmental brake-levers $i\,i'$ may be assisted, if desired, by means of one or more springs $p$, for example.

Instead of the flanges on the disk or frame $d$ being so shaped as to form a hollow cylinder at $e$ they may be shaped to form the hollow frustum of a cone or the hollow frustum of a sphere, or they may be shaped to form any other suitable hollow body.

The carriage or fixing $g$, carrying the segmental brake-levers $i\,i'$ and operating-lever $m$, may be secured to the axle $b$ by any suitable means; but I have found it convenient to partly split it, as shown at $q$, and clamp it to the axle $b$ by one or more clamping-screws $r$. There may be interposed between the carriage or fixing $g$ and the axle $b$ one or more metallic liners or brushes $s$, provided with feathers $t$ to prevent the carriage or fixing $g$ turning on the axle $b$ and to facilitate the putting of the same into its proper position on the said axle.

I prefer to protect the working parts of the above-described brake which are contained within the hollow cylinder $e$ by closing the open end of such cylinder by means of a mud and dust guard, which may consist of a cover-plate $u$, made in halves and connected to the carriage or fixing $g$ by screws or bolts $v$.

When it is desired to apply brake apparatus of the kind above described to purposes other than motor-cars and vehicles—as, for instance, to cranes and the like—the construction and arrangement of the parts must of course be modified according to circumstances.

Brake apparatus of the kind above described acts equally well whatever may be the direction of rotation of the braking-surface.

I claim—

In combination, a cylinder $e$, a fixing secured to the axle and extending above and below the said axle, a pair of brake-levers pivoted to the lower end of the fixing and extending thence upwardly and in proximity to the inner face of the cylinder, an operating-lever pivoted to the upper end of the fixing, links connecting the operating-lever above and below its pivot with the free ends of the brake-levers and a spring between the free ends of the brake-levers, substantially as described.

In witness whereof I have hereunto set my hand in presence of two witnesses.

HENRY ALONZO HOUSE, JUNIOR.

Witnesses:
ROBERT FORRESTER BORTHWICK,
STEPHEN EDWARD GRANGER.